United States Patent [19]
Kuwahara

[11] Patent Number: 5,477,778
[45] Date of Patent: Dec. 26, 1995

[54] CIRCULATIVE CATERING BAR EQUIPPED WITH WARMING SYSTEM AND COLD AIR CIRCULATION SYSTEM

[75] Inventor: Kiyohiro Kuwahara, Kanazawa, Japan

[73] Assignee: Nippon Crescent Co., Ltd., Ishikawa, Japan

[21] Appl. No.: 452,321

[22] Filed: May 26, 1995

[51] Int. Cl.⁶ .............................. A47J 37/00; A47J 37/06
[52] U.S. Cl. .................. 99/483; 99/355; 99/357; 99/443 C; 99/470; 99/484; 99/517; 62/256; 62/378; 186/42; 186/49; 219/214
[58] Field of Search .................. 99/352–355, 357, 99/361, 362, 386, 443 C, 470, 477–479, 474–476, 483, 484, 517; 219/214; 126/299 R; 62/256, 250, 246, 378–381; 198/367, 599; 186/42, 49, 44, 38, 50

[56] References Cited

U.S. PATENT DOCUMENTS

| | | | |
|---|---|---|---|
| 2,950,605 | 8/1960 | Hennion | 62/250 |
| 3,528,362 | 9/1970 | Arnold, Jr. | 99/357 |
| 3,718,082 | 2/1973 | Lipoma | 99/355 |
| 3,961,569 | 6/1976 | Kenyon et al. | 99/443 C |
| 4,165,620 | 8/1979 | Kiesel et al. | 62/256 |
| 4,329,852 | 5/1982 | Ibrahim et al. | 62/256 |
| 4,349,086 | 9/1982 | Yamada | 186/49 |
| 4,523,520 | 6/1985 | Hofmann et al. | 99/355 |
| 4,582,046 | 4/1986 | Yamada | 126/299 R |
| 4,750,335 | 6/1988 | Wallace et al. | 62/256 |
| 4,796,601 | 1/1989 | Yamada | 126/299 R |
| 4,977,823 | 12/1990 | Kuwahara | 99/355 |

*Primary Examiner*—Timothy F. Simone
*Attorney, Agent, or Firm*—Wenderoth, Lind & Ponack

[57] ABSTRACT

The invention relates to a circulative catering bar equipped with warming system and cold air circulation system which comprises a warming system in which a heater (26) is incorporated in a plate mounted on the crescent chain, a cold air circulation system having cold air paths formed beneath the refrigerating conveyor and circulating cold air onto the refrigerating conveyor, and a setting board (56), disposed above said warming system, and it is possible to cyclically convey ordinary goods, warmed goods and refrigerated goods at the same time by cyclically conveying ordinary goods and warmed goods on a crescent chain of the warming system and cyclically conveying refrigerated goods on the refrigerating conveyor.

7 Claims, 7 Drawing Sheets

CIRCULATIVE CATERING BAR EQUIPPED WITH WARMING SYSTEM AND COLD AIR CIRCULATION SYSTEM

BACKGROUND OF THE INVENTION

1. Field of the Invention

The present invention relates to a circulative catering bar that can not only provide goods which are to be simply conveyed cyclically, such as bread and cake, but also goods which need to be kept warm, such as pots of coffee, tea, etc. and goods which need to be refrigerated, such as salad, fruit, etc.

2. Description of Prior Arts

Separate prior examples of such types of a circulative catering bar include those documented in U.S. Pat. No. 4977823 which have been filed priorly by the applicant of the present patent application.

This example is such that cold air is supplied onto the crescent chain and presents only the refrigerated goods.

The problem is that the above-mentioned conventional example cannot provide ordinary goods and warmed goods.

Also, since goods are cyclically conveyed on the crescent chain in a constant manner in both examples, it was difficult to take the goods from the crescent chain.

With the increasing abundance of types of food in recent years, the customers' preferences of food and drinks have also become diversified and there is a stronger desire for eating all three types of goods, namely, ordinary goods, warmed goods, and refrigerated goods, at the same time.

SUMMARY OF THE INVENTION

The invention is a circulative catering bar in which a crescent chain, which cyclically conveys goods, is provided above a base and which is comprised of a warming system, arranged by disposing electrical wires, connected to a power source, at both sides of the interior of the base below the crescent chain, by incorporating a heater in a plate mounted on the crescent chain, and by connecting said electrical wires with said heater, a cold air circulation system, arranged by providing a refrigerating conveyor at the inner periphery of the crescent chain, with a partition board being disposed between said refrigerating conveyor and said crescent chain and a small interval being maintained between said partition board and refrigerating conveyor, by forming an airtight first cold air path, connected with said small interval, in the interior of the base below the partition board side of said refrigerating conveyor, by providing a fan, for blowing air downwards, within said first cold air path while maintaining a small interval between the inner peripheral side of said refrigerating conveyor and said base, and forming an airtight second cold air path, connected with said small interval, at the interior of the base below the inner peripheral side of said refrigerating conveyor so as to be coupled with said first cold air path, by disposing refrigerating fins within said second cold air path, and by providing a cold air outlet, from which cold air is blown towards said partition board, at the upper end of said second cold air path above said partition board, and a setting board disposed above said alarming system. Said circulative catering bar is also one in which, where necessary, a power supplying device, which is slidably disposed on a rail disposed within the base below the crescent chain, is connected with the heater within the plate mounted on the crescent chain to arrange the warming system and/or a retrieval conveyor, for retrieving dishes, is disposed above the refrigerating conveyor and/or one end of the retrieval conveyor protrudes to the kitchen and/or the refrigerating conveyor of the cold air circulation system is conveyed intermittently and/or the first cold air path and the second cold air path of the cold air circulation system are covered with insulating material and/or the mounting plate is formed from transparent material.

In view of the above-mentioned disadvantages, to accommodate for this desire, it is therefore an object of the invention to provide a circulative catering bar equipped with a warming system and a cold air circulation system, whereby goods may be taken easily and the three types of goods, ie. ordinary goods, warmed goods, and refrigerated goods, can be provided at the same time.

It is a further object of the invention to provide a circulative catering bar equipped with warming system and cold air circulation system, by which ordinary goods, warmed goods and refrigerated goods are provided simultaneously since ordinary goods that do not need to be kept warm, such as bread, cake, coffee cup, etc., and goods that need to be kept warm, such as pots of coffee, tea, etc., are respectively conveyed cyclically on the crescent chain of the warming system while refrigerated goods, such as salad, fruit, etc. are cyclically conveyed on the refrigerating conveyor of the cold air circulation system.

Also, since a setting board is disposed above the crescent chain of the warming system, dishes, onto which refrigerated goods on the refrigerating conveyor are portioned out and placed, may be placed on this setting board to facilitate the portioning out of goods and a sanitary condition is provided since the upper part of the crescent chain of the warming system is covered by the setting board and the ordinary goods and the warmed goods on the crescent chain are thereby protected from dust, etc. and the refrigerated goods portioned out from the refrigerating conveyor are prevented from falling on the goods on the crescent chain of the warming system.

Also, by disposing, above the refrigerating conveyor of the cold air circulation system, a retrieval conveyor for retrieving tableware, such as the dishes from which customers have eaten or dishes used by customers, the tableware can be retrieved automatically upon setting such tableware on the retrieval conveyor and the upper part of the refrigerated container can be covered so that the refrigerated goods are protected from dust, etc. and are thereby kept sanitary.

Also, by making one end of the retrieval conveyor protrude to the kitchen, used tableware may be returned to the kitchen automatically.

Also, by making the refrigerating conveyor convey intermittently, the refrigerated goods on the refrigerating conveyor may be stopped temporarily to facilitate the taking of refrigerated goods.

Also, by covering the first cold air path and second cold air path of the cold air circulation system with insulating material, the cold air can be prevented from being influenced by external temperatures and the refrigerating effect can be improved.

Also, by forming the above setting board from transparent material, the goods on the crescent chain of the warming system may be seen more easily.

BRIEF DESCRIPTION OF THE DRAWINGS

These and other objects and benefits of the invention will be made clear in the detailed description with reference to the drawings attached herewith.

DETAILED DESCRIPTION OF A PREFERRED EMBODIMENT

Figure 1:
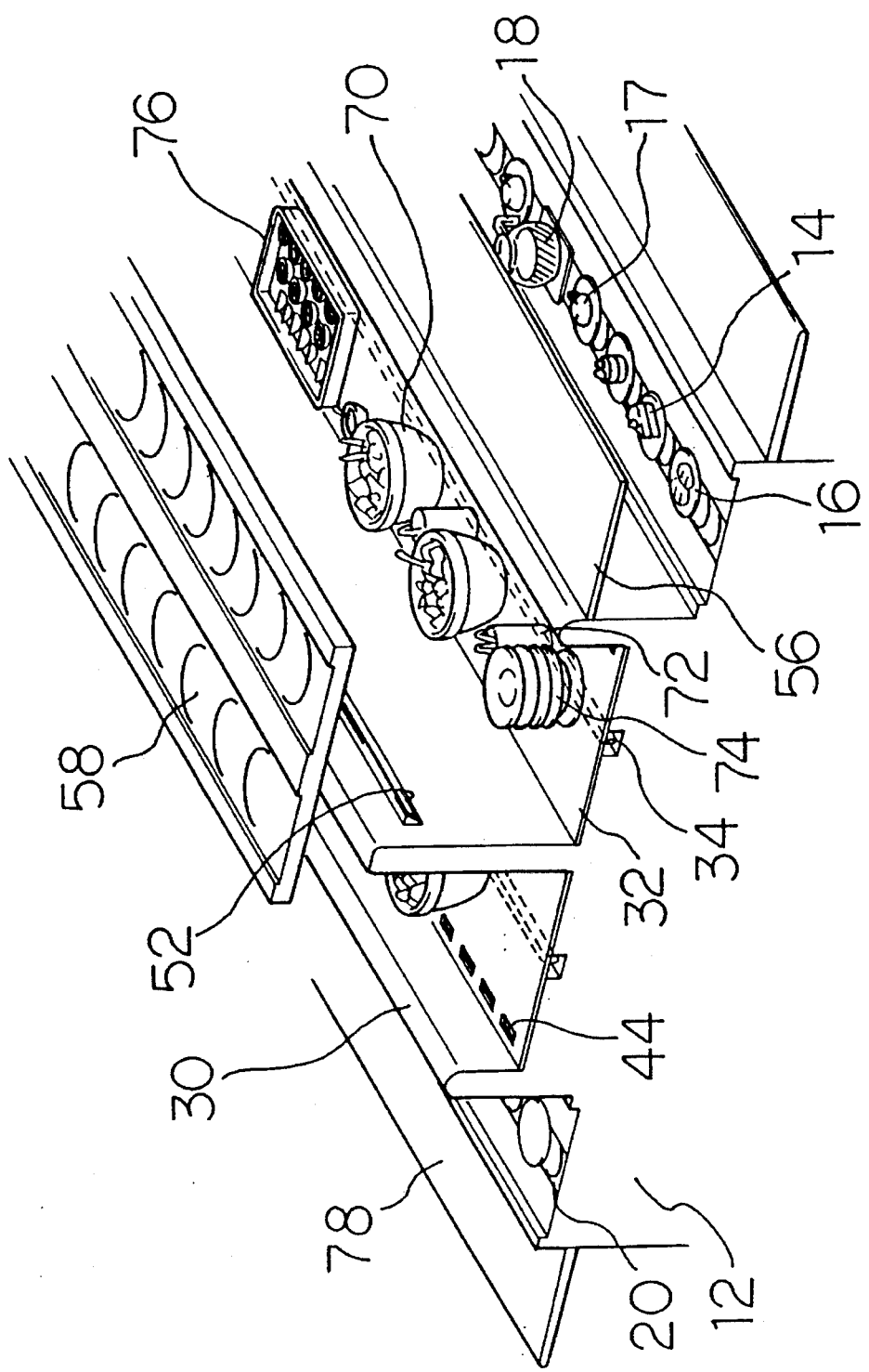
FIG. 1 is a perspective view of the circulative catering bar equipped with warming system and cold air circulation system by the invention with parts partially broken away.
Figure 2:
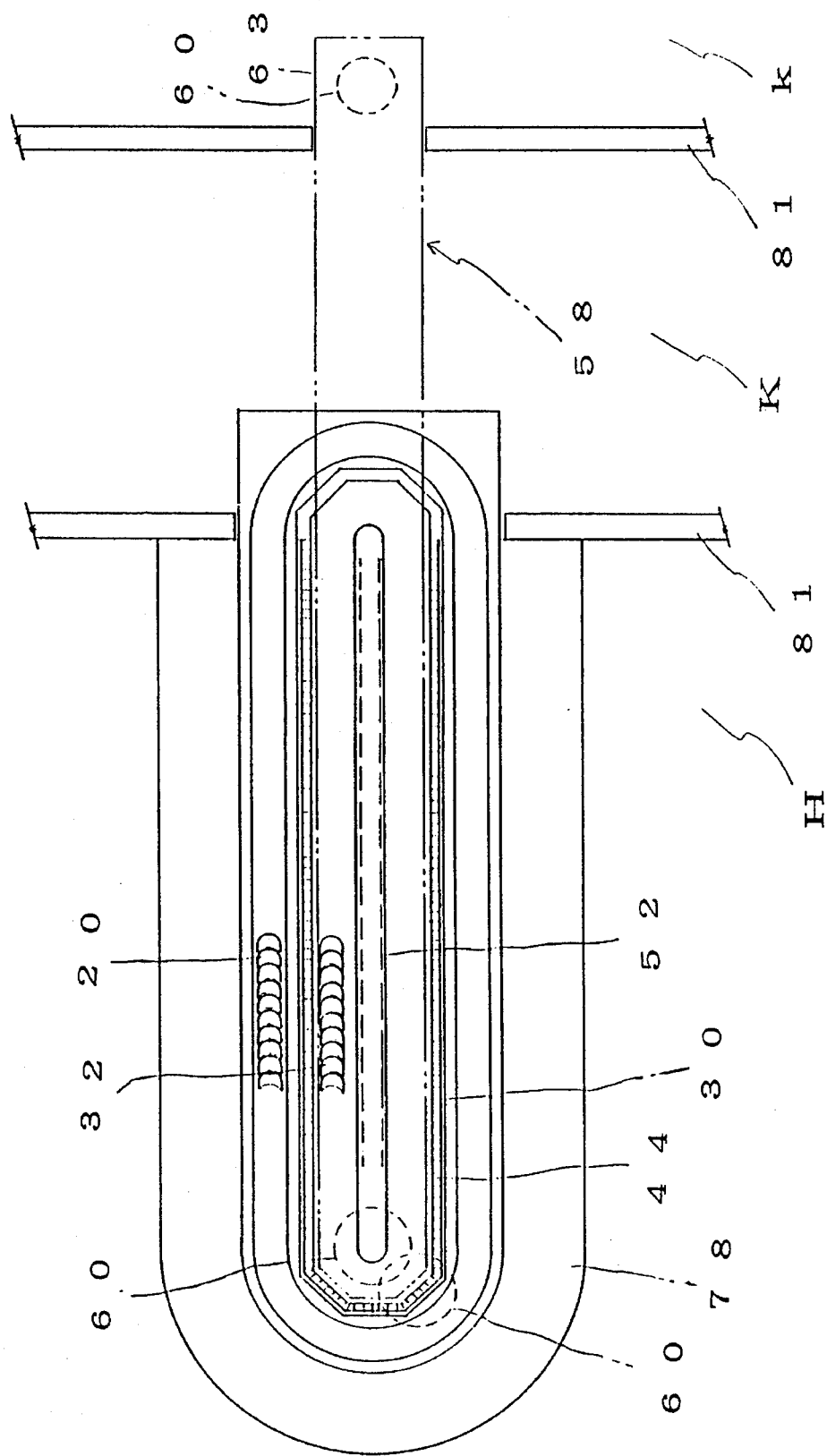
FIG. 2 is a top view of the same.
Figure 3:
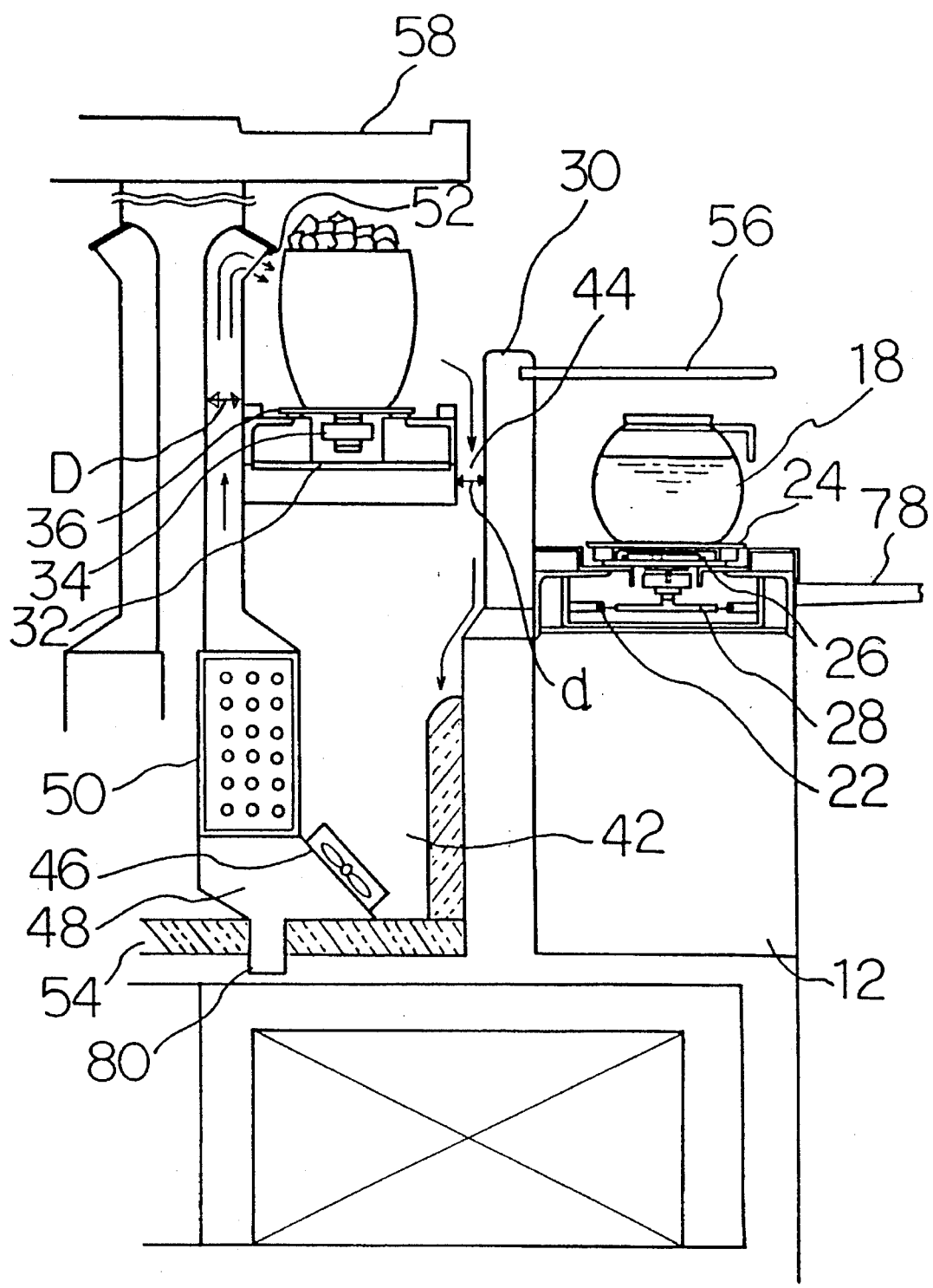
FIG. 3 is a vertical sectional view of the right side part of FIG. 1.

As shown in FIGS. 1 to 7, the circulative catering bar equipped with warming system and cold air circulation system of the invention is arranged as follows.

In the circulative catering bar used in the invention, a crescent chain 20, which cyclically conveys goods 14, ie., in the invention, dishes 16 on which bread, cake, etc. are placed, coffee cups 17, and pots 18 of coffee or tea, is provided above base 12 with one end thereof protruding to the kitchen K and parts besides said end being disposed at the hall H.

This crescent chain 20 is provided with a warming system with the following arrangement.

Electrical wires 22, connected to a power source (not shown), are disposed at both sides of the interior of base 12 below the crescent chain 20. A heater 26 is incorporated in a designated plate 24 mounted on the crescent chain 20 and the electrical wires 22 are connected with heater 26.

In the preferred embodiment, the connection of electrical wires 22 and heater 26 is provided below a heater 26 and is made by a conductive member 28 which is slidably mounted between both electrical wires 22.

Figure 4:
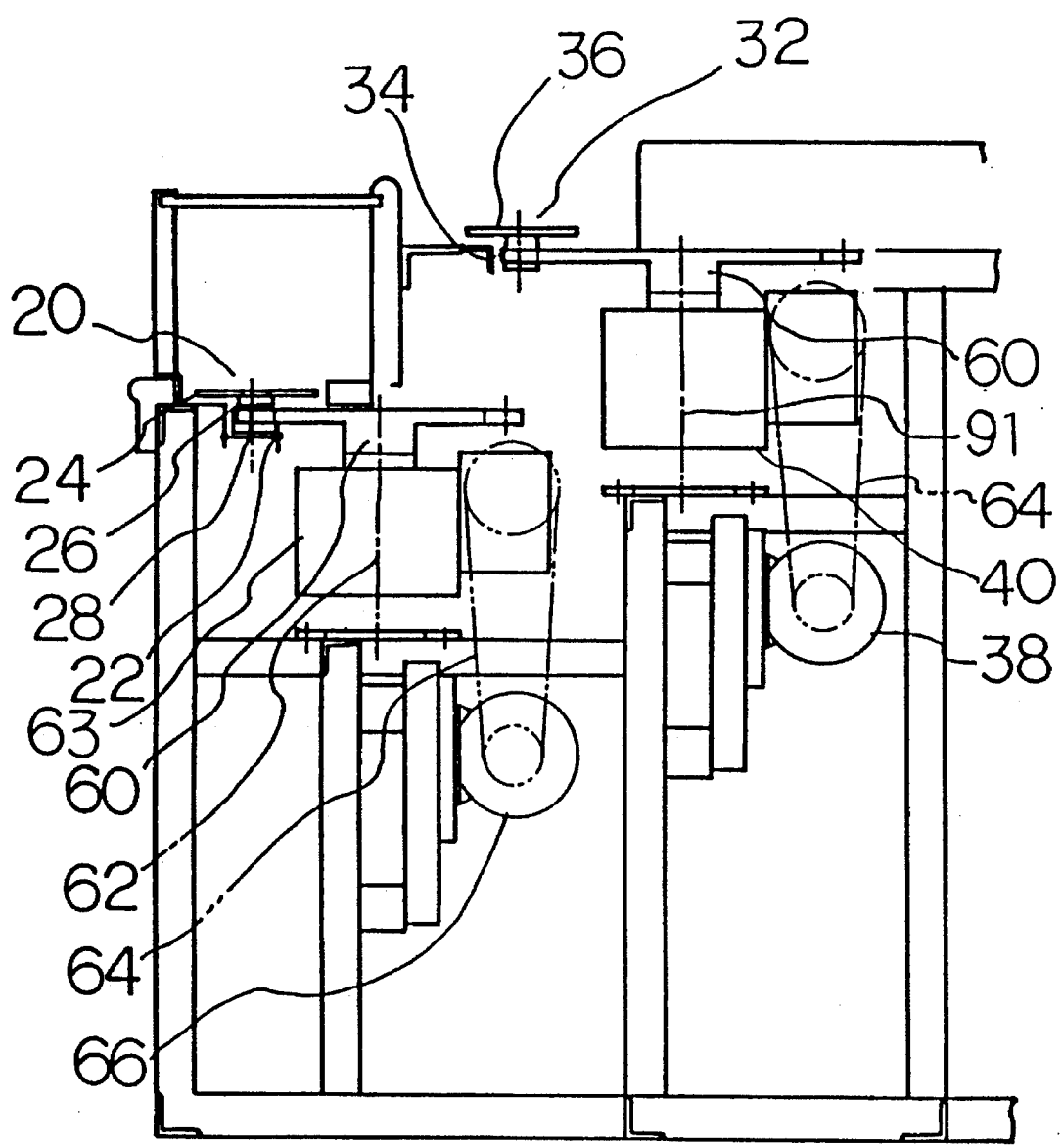
FIG. 4 is a front schematic view showing the driving mechanism of the crescent chain and the refrigerating conveyor.
Figure 5:
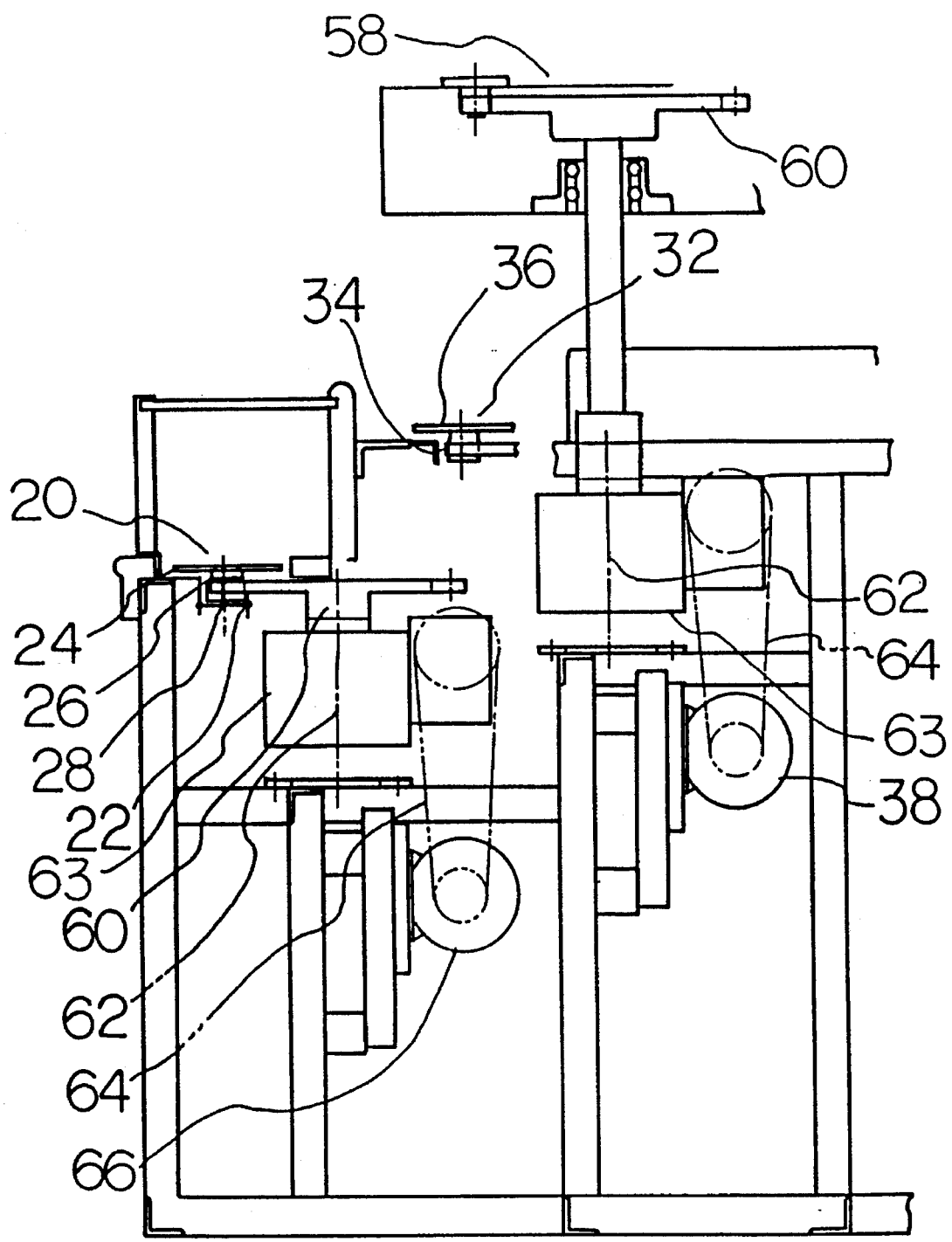
FIG. 5 is a front schematic view showing the driving mechanism of the refrigerating conveyor.

As shown in FIG. 4, the driving mechanism of crescent chain 20 is arranged by providing a driving sprocket 60 at one side of the crescent chain 20 and coupling the drive shaft 62 of this driving sprocket 60 to a motor 66 via speed reducer 63 and transmission belt 64.

The driving action is such that when the motor 66 is driven, the drive shaft 62 is driven via transmission belt 64 and speed reducer 63 and crescent chain 20 is thereby driven and cycled.

The cold air circulation system has the following arrangement.

A refrigerating conveyor 32 is provided at the inner periphery of the crescent chain 20, with a partition board 30 disposed between the refrigerating conveyor 32 and crescent chain 20 and a small interval d being maintained between the partition board 30 and refrigerator conveyor 32.

In the preferred embodiment, the refrigerating conveyor 32 is disposed above crescent chain 20 in order to facilitate the taking of refrigerated goods and is one in which a plate 36 is mounted on an endless chain 34 and a driving motor 38, which drives endless chain 34, is driven intermittently by an intermittent speed reducer 40.

Figure 6:
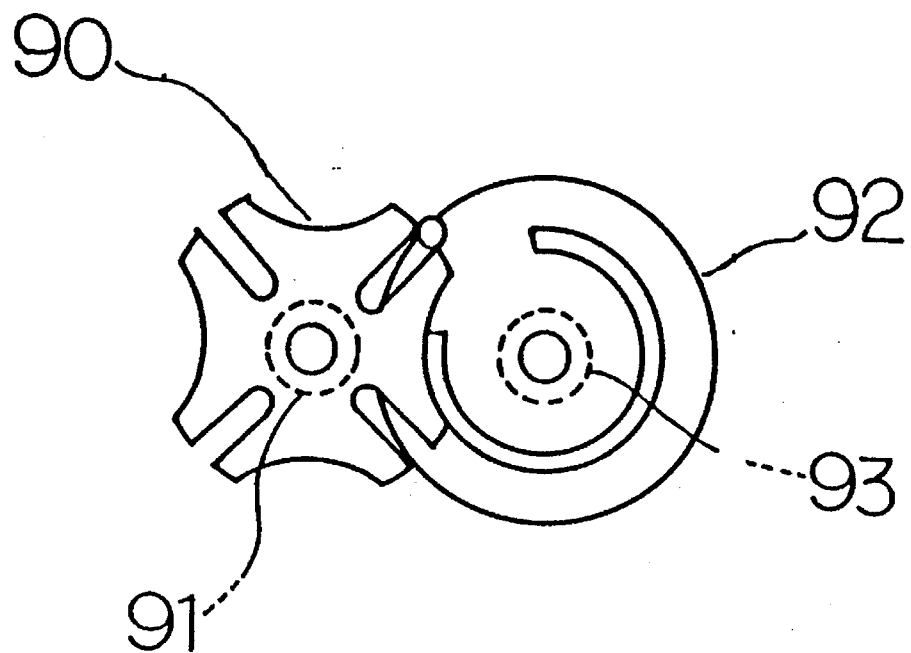
FIG. 6 is a plan view of the driving mechanism (intermittent speed reducer) of the refrigerating conveyor showing the major parts.
Figure 7:
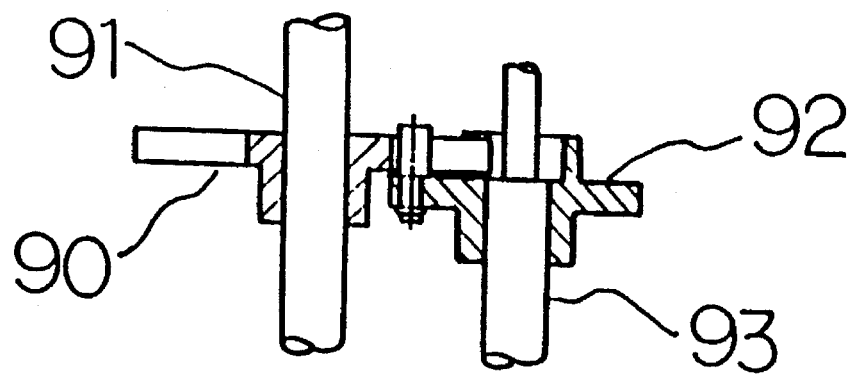
FIG. 7 is a vertical sectional view of the same.

As shown in FIGS. 6 and 7, intermittent speed reducer 40 is one in which the wheel 92 of a Geneva gear is mounted on drive shaft 91 of the refrigerating conveyor and the gear driver 92 of the Geneva gear is mounted on rotation shaft 93 at the motor 38 and, for example, if driver 92 is rotated once in approximately 4 minutes by motor 38, the refrigerating conveyor 32 conveys for approximately 1 minute and then stops for approximately 3 minutes. Intermittent conveying of refrigerated goods is thus enabled.

The small interval d part at the upper end of this first cold air path 42 forms the cold air inlet 44.

A fan 46, for blowing air downwards (towards the second cold air path 48 mentioned below), is provided inside first air path 42.

Meanwhile, a small interval D is maintained between the inner peripheral side (left side in FIG. 3) of the refrigerating conveyor 32 and base 12 and an airtight second air path 48, connected to this small interval D, is formed inside base 12 below the inner peripheral side of the refrigerating conveyor 32 in a manner whereby it is coupled with first cold air path 42.

A refrigerating fin 50, for generating cold air, is disposed within second cold air path 48.

A cold air outlet 52, from which cold air is blown towards the above-mentioned partition board 30, is provided at the upper end of second cold air path 48 (upper end of the small interval D part) above the partition board 30.

Thus, the cold air generated by refrigerating fin 50 of second cold air path 48 is sequentially circulated through second cold air path 48 and cold air outlet 52, over the refrigerating conveyor 32 and through cold air inlet 44 and first cold air path 42 by fan 46 of first cold air path 42.

In the preferred embodiment, first cold air path 42 and second cold air path 48 are respectively provided with insulating material 54 for improving the refrigeration effect.

A setting board 56 is also disposed above the warming system.

In the preferred embodiment, setting board 56 projects from partition board 30.

Also, the upper part of crescent chain 20 of the warming system is covered by setting board 56. This is very effective for sanitation since dust, etc. is thereby prevented from depositing on goods such as cakes, coffee pots, etc.

In order to retrieve tableware, such as the dishes from which customers have eaten and dishes used by customers, a retrieval conveyor 58 is disposed above the refrigerating conveyor 32 and, like crescent chain 20, with one end protruding to the kitchen K.

In order to facilitate the taking of refrigerated goods from the refrigerating conveyor 32, retrieval conveyor 58 is disposed above partition board 30 in the preferred embodiment. Refrigerated goods on the refrigerating conveyor 32 may thus be taken from between the front lower edge of retrieval conveyor 58 and the upper end of partition board 30.

The position to which retrieval conveyor 58 protrudes in the direction of kitchen K, where cooking is performed, reaches the second kitchen k (upper side in FIG. 2) behind kitchen K and the used tableware retrieved by retrieval conveyor 58 is washed in this second kitchen k.

Furthermore, since the upper part of the refrigerating conveyor 32 is covered by this retrieval conveyor 58, the refrigerated goods are protected from dust, etc.

The description of the driving mechanism of retrieval conveyor 58 shall be omitted since it is the same as that of crescent chain 20, described above (see FIG. 5).

Also, since a working space is not provided at the inner side of the circulative catering bar in the preferred embodiment and each component is disposed symmetrically at the left and right sides (left and right in FIG. 1), the space occupied by the circulative catering bar can be made small and the installation area can be reduced.

Furthermore, the circulative catering bar of the preferred embodiment can be used in restaurants of either the seating type or the standing type and although the customers standing or seated at the left and right sides of the circulative catering bar face each other, since the central part of the circulative catering bar is partitioned by the side wall of second cold air path 46 of the cold air circulation system, the customers in front will not enter the field of view and the goods on the circulative catering bar may be eaten without minding the customer in front.

In the drawings, 70 indicates a salad bowl, 72 a salad server, 74 a dish, 76 a fruit, 78 a counter, 80 a drain hole and 81 a partition wall.

Figure 8:
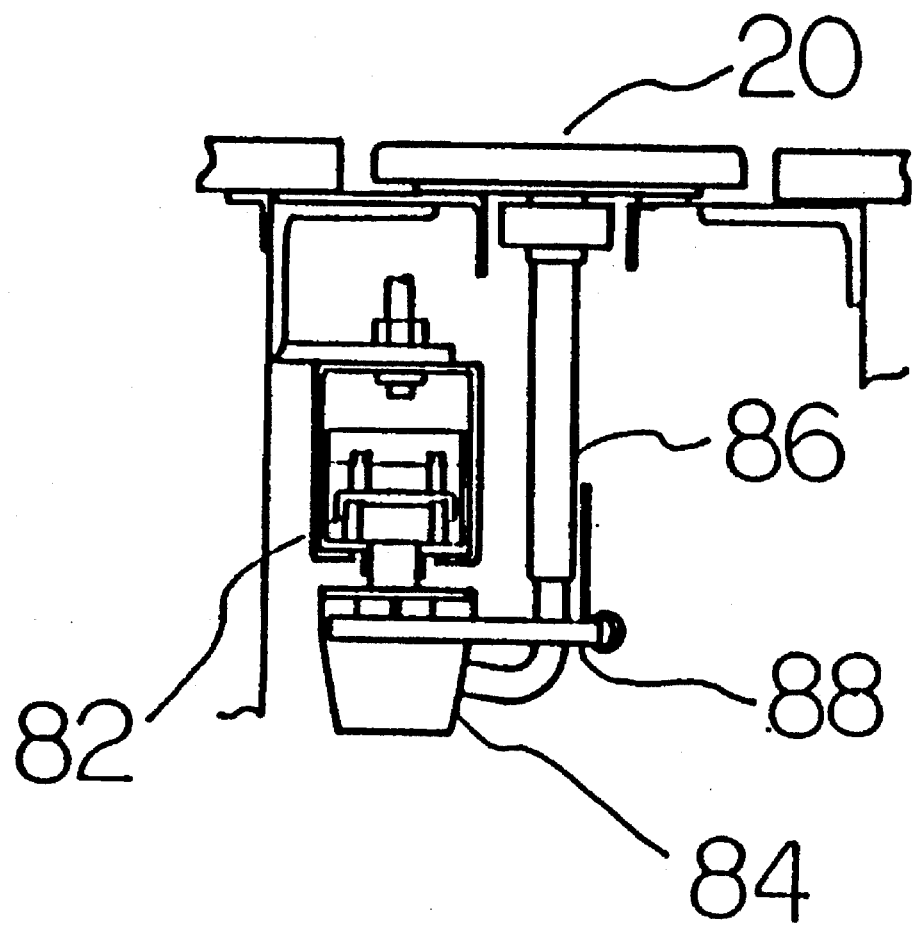
FIG. 8 is a vertical sectional view showing another embodiment of the warming system.

FIG. 8 shows another embodiment of the warming system.

In the warming system of this embodiment, the above-described connection of electrical wires 22 and heater 26 is replaced by the connection of a power supplying device 84, which is slidably provided on a rail 82 disposed inside base 12 below crescent chain 20, with a heater 26 inside plate 24 mounted on crescent chain 20.

In the preferred embodiment, power supplying device 84 is coupled via support arm 88 to coupling tube 86 descending from plate 24 and is cyclically conveyed together with plate 24.

Although the circulative catering bar is not provided with a working space at its inner side and each component is disposed symmetrically at the left and right sides in all embodiments described, it is obvious that a working space may be provided at the inner side.

Although crescent chain 20, the refrigerating conveyor 32 and retrieval conveyor 58 are disposed in a manner whereby one end thereof projects to kitchen K in all embodiments described, it is obvious that these may be disposed within the hall and without protruding to the kitchen.

Although the refrigerating conveyor 32 of the cold air circulation system is conveyed intermittently by means of intermittent speed reducer 40 in all embodiments described, it is obvious that intermittent speed reducer 40 may be omitted in the case where motor 38 is simply driven and stopped electrically.

Although the refrigerating conveyor 32 of the cold air circulation system is conveyed intermittently in all embodiments described, it is obvious that it may be conveyed cyclically in a constant manner.

Although the refrigerating conveyor 32 is disposed above crescent chain 20 in all embodiments described, it is obvious that it may be disposed on substantially the same plane as crescent chain 20.

Although retrieval conveyor 58 is an endless chain like crescent chain 20 in all embodiments described, it is obvious that it may be a conveyor having a base end and a front end and that one such conveyor may be disposed or two such conveyors may be disposed in parallel.

Although setting board 56 projects from partition board 30 in all embodiments described, it is obvious that it may be disposed above crescent chain 20 using a column (not shown).

With the preferred embodiments of the invention, the following actions will be provided:

In using the circulative catering bar equipped with warming system and cold air circulation system by the invention, ordinary goods that do not need to be kept warm, such as dishes on which bread and cake are placed, coffee cups, etc., are respectively placed on plates in which a heater is not incorporated and goods that need to kept warm, such as pots of coffee and tea, are respectively placed on plates incorporating a heater, at the crescent chain of the warming system and conveyed cyclically.

Goods requiring refrigeration, for example, salad bowls containing salad, dishes with fruit, and tableware such as salad servers for serving salad, serving ladles for dishing up salads, and dishes on which salad portions are placed, are respectively placed on the refrigerating conveyor of the cold air circulation system and conveyed cyclically.

By making the refrigerating conveyor convey intermittently at this time, the refrigerated goods on the refrigerating conveyor may be stopped temporarily so that they can be taken easily.

Also, since a setting board is disposed above the crescent chain of the warming system, dishes, onto which refrigerated goods on the refrigerating conveyor are portioned out and placed, may be set on this setting board so that refrigerated goods may be portioned out easily. Furthermore, a sanitary condition is provided since the upper part of the crescent chain of the warming system is covered by the setting board and the ordinary goods and the warmed goods on the crescent chain are thereby protected from dust, etc. while the refrigerated goods portioned out from the refrigerating conveyor are prevented from falling on the goods on the crescent chain of the warming system.

By forming the above setting board from transparent material, the goods on the crescent chain of the warming system may be seen more easily.

Also, if a retrieval conveyor for retrieving tableware, such as the dishes from which customers have eaten or dishes used by customers, is disposed above the refrigerating conveyor of the cold air circulation system with one end thereof protruding to the kitchen, the tableware can be returned automatically to the kitchen upon setting such tableware on the retrieval conveyor and the upper part of the refrigerated container can be covered so that the refrigerated goods are protected from dust, etc. and thereby kept sanitary.

Furthermore, by covering the first cold air path and second cold air path of the cold air circulation system with insulating material, the cold air can be prevented from being influenced by external temperatures and the refrigerating effect can be improved.

What is claimed is:

1. In a circulative catering bar wherein a crescent chain (20), which cyclically conveys goods (14), is provided above a base (12), a circulative catering bar equipped with warming system and cold air circulation system comprising;

a warming system, arranged by disposing electrical wires (22), connected to a power source, at both sides of the interior of the base (12) below the crescent chain (20), by incorporating a heater (26) in a plate (24) mounted on the crescent chain (20), and by connecting said electrical wires (22) with said heater (26), a cold air circulation system, arranged by providing a refrigerating conveyor (32) at the inner periphery of the crescent chain (20), with a partition board (30) being disposed between said refrigerator conveyor (32) and said crescent chain (20) and a small interval (d) being maintained between said partition board (30) and refrigerating conveyor (32), by forming an airtight first cold air path (42), connected with said small interval (d), in the interior of the base (12) below the partition board (30) side of said refrigerating conveyor (32), by providing a fan (46), for blowing air downwards, within said first cold air path (42) while maintaining a small interval (D) between the inner peripheral side of said refrigerating conveyor (32) and said base (12), by forming an airtight second cold air path (48), connected with said small interval (D), at the interior of the base (12) below the inner peripheral side of said refrigerating conveyor (32) so as to be coupled with said first cold air path (42), by disposing refrigerating fins (50) within said second cold air path (48), and by providing a cold air outlet (52), from which cold air is blown towards said partition board (30), at the upper end of said second cold air path (48) above said partition board (30), and a setting board (56), disposed above said warming system.

2. A circulative catering bar equipped with warming system and cold air circulation system as set forth in claim 1, wherein the connection of the electrical wires (22) with the heater (26) is replaced by a connection of a power supplying device (84), which is slidably disposed on a rail (82) disposed within the base (12) below the crescent chain, with the heater (26) within the plate (24) mounted on the crescent chain (20).

3. A circulative catering bar equipped with warming system and cold air circulation system as set forth in claim 1, wherein a retrieval conveyor (58), for retrieving dishes (16), is disposed above the refrigerating conveyor (32).

4. A circulative catering bar equipped with warming system and cold air circulation system as set forth in claim 1, wherein one end of the retrieval conveyor (58) protrudes to the kitchen.

5. A circulative catering bar equipped with warming system and cold air circulation system as set forth in claim 1, wherein the refrigerating conveyor (32) of the cold air circulation system conveys intermittently.

6. A circulative catering bar equipped with warming system and cold air circulation system as set forth in claim 1, wherein the first cold air path (42) and the second cold air path (48) of the cold air circulation system are covered with insulating material (54).

7. A circulative catering bar equipped with warming system and cold air circulation system as set forth in claim 1, wherein the setting board (56) is formed from transparent material.

* * * * *